(12) United States Patent
Vitiello et al.

(10) Patent No.: US 11,492,575 B2
(45) Date of Patent: Nov. 8, 2022

(54) WATER-SOLUBLE UNIT DOSE ARTICLE COMPRISING A WATER-SOLUBLE FILM COMPRISING A WATER SOLUBLE POLYVINYL ALCOHOL POLYMER

(71) Applicant: The Procter & Gamble Company, Cincinnati, OH (US)

(72) Inventors: Luca Vitiello, Brussels (BE); Florence Catherine Courchay, Brussels (BE); Robby Renilde Francois Keuleers, Lippelo (BE); Miguel Brandt Sanz, Tervuren (BE); Regine Labeque, Neder over Heembeek (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/832,310

(22) Filed: Mar. 27, 2020

(65) Prior Publication Data
US 2020/0308515 A1    Oct. 1, 2020

(30) Foreign Application Priority Data

Apr. 1, 2019    (EP) ..................................... 19166632

(51) Int. Cl.
*C11D 17/04*    (2006.01)
*B32B 3/26*    (2006.01)
*B32B 27/30*    (2006.01)

(52) U.S. Cl.
CPC .............. *C11D 17/045* (2013.01); *B32B 3/26* (2013.01); *B32B 27/306* (2013.01); *B32B 2307/31* (2013.01); *B32B 2307/7166* (2013.01); *B32B 2439/40* (2013.01)

(58) Field of Classification Search
CPC ................................ C11D 17/045; B32B 3/26
See application file for complete search history.

(56) References Cited

U.S. PATENT DOCUMENTS

| | | | |
|---|---|---|---|
| 2004/0142131 A1* | 7/2004 | Edwards | B65D 65/46 428/35.7 |
| 2011/0139671 A1* | 6/2011 | Edwards | B32B 27/306 206/524.6 |
| 2015/0210969 A1* | 7/2015 | Brandt-Sanz | C11D 17/043 510/220 |
| 2015/0275152 A1* | 10/2015 | Brooker | C11D 17/042 510/296 |
| 2015/0336691 A1* | 11/2015 | Fowler | B65B 51/026 206/524.7 |

(Continued)

FOREIGN PATENT DOCUMENTS

| | | | |
|---|---|---|---|
| EP | 3712238 A1 * | 9/2020 | ............. C11D 1/146 |
| JP | 2018104563 A | 7/2018 | |

(Continued)

OTHER PUBLICATIONS

EP Search Report for appl. No. 19166632.0-1105, dated Feb. 10, 2019, 8 pages.

(Continued)

*Primary Examiner* — Nicole M. Buie-Hatcher
*Assistant Examiner* — M. Reza Asdjodi
(74) *Attorney, Agent, or Firm* — Gregory S. Darley-Emerson

(57) ABSTRACT

Multicompartment water-soluble unit dose articles and methods of making them.

15 Claims, 2 Drawing Sheets

(56) References Cited

U.S. PATENT DOCUMENTS

| | | | |
|---|---|---|---|
| 2015/0336692 A1* | 11/2015 | Brandt Sanz | B65B 39/14 |
| | | | 53/450 |
| 2016/0017264 A1* | 1/2016 | Cumming | C11D 17/045 |
| | | | 206/525 |
| 2016/0251148 A1 | 9/2016 | Edwards | |
| 2017/0213412 A1 | 8/2017 | Marechal et al. | |
| 2017/0226298 A1 | 8/2017 | Friedrich | |
| 2017/0233539 A1* | 8/2017 | Friedrich | C11D 17/043 |
| | | | 510/296 |
| 2017/0298216 A1* | 10/2017 | Labeque | B65B 1/02 |
| 2017/0355935 A1 | 12/2017 | Courchay | |
| 2017/0369217 A1* | 12/2017 | Souter | B65D 65/38 |
| 2018/0211289 A1 | 7/2018 | Chanda | |
| 2018/0312789 A1 | 11/2018 | Edwards | |
| 2018/0370703 A1* | 12/2018 | Boswell | C08J 7/048 |
| 2019/0211289 A1 | 7/2019 | Friedrich et al. | |
| 2019/0376010 A1* | 12/2019 | Salaam | C11D 11/0017 |
| 2020/0131457 A1 | 4/2020 | Depoot | |
| 2020/0303516 A1 | 10/2020 | Viiielio et al. | |
| 2020/0308515 A1* | 10/2020 | Vitiello | C11D 17/045 |
| 2020/0308516 A1* | 10/2020 | Vitiello | C11D 11/0023 |

FOREIGN PATENT DOCUMENTS

| | | |
|---|---|---|
| JP | 2019044048 A | 3/2019 |
| WO | 2017043511 A1 | 3/2017 |
| WO | 2017180888 A1 | 10/2017 |

OTHER PUBLICATIONS

EP Search Report for appl. No. 19166637.9-1105, dated Oct. 14, 2019, 8 pages.
International Search Report and Written Opinion; Application Ser. No. PCT/US2020/025894; dated Jun. 18, 2020, 12 pages.
All Office Actions, U.S. Appl. No. 16/832,328.

* cited by examiner

WATER-SOLUBLE UNIT DOSE ARTICLE COMPRISING A WATER-SOLUBLE FILM COMPRISING A WATER SOLUBLE POLYVINYL ALCOHOL POLYMER

FIELD OF THE INVENTION

Multicompartment water-soluble unit dose articles and methods of making them.

BACKGROUND OF THE INVENTION

Water-soluble unit dose articles are preferred by consumers. Such articles comprise water-soluble films defining internal compartments, and treatment compositions, such as detergent compositions, are contained within the compartments. Most preferred are 'superposed' water-soluble unit dose articles, in which at least a first compartment is arranged above another compartment. Such superposed unit dose articles are preferred by consumers due to their compacted shape.

It is possible to make superposed unit dose articles using 3 or 4 water-soluble films. Without wishing to be bound by theory, 3 film superposed unit dose articles are arranged such that a first and a second film define at least a first internal compartment. At least a second compartment, is then defined between the second film and a third film. In such an execution, the three films are all sealed together in at least one region of the unit dose article. For 4 film superposed unit dose articles at least a first compartment is formed between a first film and a second film, and a second compartment between a third film and a fourth film. The second and third films are then at least partially sealed together typically in a flange region (the flange region is composed of excess sealed film material and is present on the outside of the unit dose article) and the resulting unit dose article comprises one compartment superposed on top of another compartment (wherein the compartments are separated by at least two films), and has at least one region in which all 4 films are sealed together, e.g. typically within the flange region. Such water-soluble unit dose articles have been described previously in WO2013190517.

Such 4 film unit dose articles have certain benefits and so there is a desire for such unit dose articles. Benefits include the fact that there is less criticality in ensuring accurate alignment between the top and bottom compartments such to both top and bottom compartments individually being sealed ahead of being combined. For 3 film unit dose articles it is essential that the top compartments and bottom compartments are aligned accurately since the middle film ensures closure of both the top and bottom compartments. Any misalignment would result in leakage from one or more compartments. Such accurate alignment needs result in increased complexity during manufacture. Additionally, certain internal compartments are separated by at least two layers of water-soluble film. This provide an additional barrier against migration of incompatible ingredients through the film from one compartment to another.

Furthermore, "dual superposed layer" 4 film water soluble unit dose articles can be made, allowing for more internal compartments to be created and so allowing for more formulation flexibility in view of separating incompatible materials. Without wishing to be bound by theory, such water-soluble unit dose articles would comprise at least one bottom compartment enclosed between the first and second water soluble film, at least one middle compartment enclosed between the second and third water soluble film, and at least one top compartment enclosed between the third and fourth water soluble film.

However, an issue encountered with 4 film unit dose articles is the fact that regions of the unit dose article require all 4 films to be sealed together. Such 4 film seal regions are particularly sensitive to humidity variations (more so than 3 film seal regions) as experienced during manufacture, transport and storage of the unit dose article. This sensitivity can result in seal failure which can detrimentally affect the structural integrity of such unit dose articles.

The same applies for water soluble pouches comprising more than 4 water soluble films sealed together in at least one region of the water soluble unit dose article, e.g for pouches comprising 3 or more superposed layers, each layer separated by one water soluble film, or pouches comprising at least 2 superposed layers separated by two water soluble films, or a mixture of layers separated by one and by 2 water soluble films.

Therefore, there is a need in the art for a water-soluble unit dose article comprising at least 4 water-soluble films in which there is at least one region in which all 4 films are sealed together, that exhibits reduced sensitivity to humidity variation.

It was surprisingly found that water-soluble unit dose articles comprising water-soluble films comprising a water soluble polyvinyl alcohol polymer, wherein the water soluble polyvinyl alcohol polymer is a polyvinyl alcohol homopolymer provided such benefit.

SUMMARY OF THE INVENTION

The present disclosure relates to a multicompartment water-soluble unit dose article having at least a first water-soluble film, a second water-soluble film, a third water-soluble film and a fourth water-soluble film, wherein the first water-soluble film, the second water-soluble film, the third water-soluble film, the fourth water-soluble film, or a mixture thereof, includes a water soluble polyvinyl alcohol polymer where the water soluble polyvinyl alcohol polymer is a polyvinyl alcohol homopolymer and where the polyvinyl alcohol homopolymer includes a vinyl alcohol monomer unit, and optionally a vinyl acetate monomer unit, and where the multicompartment water-soluble unit dose article includes at least one seal region in which the first water-soluble film, the second water-soluble film, the third water-soluble film and the fourth water-soluble films are sealed together, and where the water-soluble films define at least two internal compartments in superposed position, and the two internal compartments are separated from one another by at least two water-soluble films.

The present disclosure also relates to a process for making a water-soluble unit dose article according to the invention comprising the steps of:
a. deforming the first water-soluble film into a cavity to make at least one open compartment;
b. filling the at least one open compartment from step a with a treatment composition;
c. closing the at least one open compartment from step b with the second water-soluble film;
d. sealing the first water-soluble film and the second water-soluble film together to make an at least first closed intermediate article;
e. deforming the fourth water-soluble film into a cavity to create at least one open compartment;
f. filling the at least one open compartment from step e with a treatment composition;

g. closing the at least one open compartment from step f with the third water-soluble film;

h. sealing the third water-soluble film and the fourth water-soluble film together to form at least a second closed intermediate article;

i. bringing the first closed intermediate article and the second closed intermediate article into contact with one another such that the second water-soluble film and the third water-soluble film are brought into contact with one another;

j. creating at least a partial seal between the second water-soluble film and third water-soluble film to create the water-soluble unit dose article.

DETAILED DESCRIPTION OF THE INVENTION

Multicompartment Water-Soluble Unit Dose Article

Figure 1:
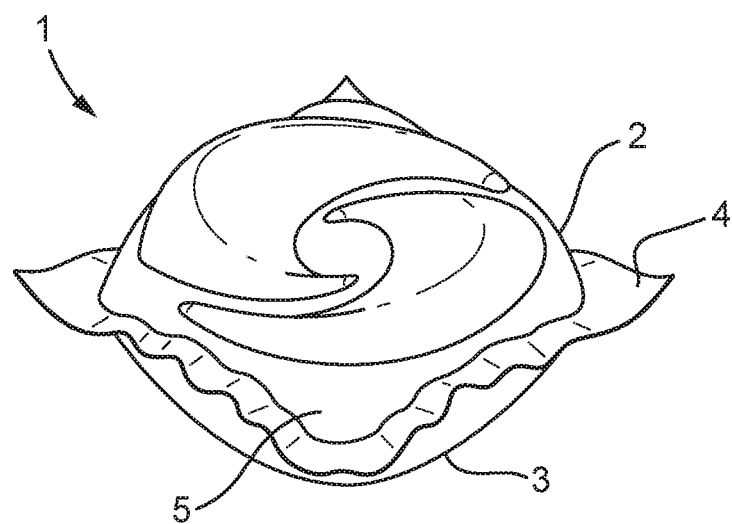
FIG. 1 is a water-soluble unit dose article according to the present disclosure.

The present disclosure relates to a multicompartment water-soluble unit dose article. Without wishing to be bound by theory, a water-soluble unit dose article is designed to be a single use dose of a treatment composition enclosed in a water-soluble film. Upon addition to water, the film disintegrates and/or dissolves releasing the internal treatment composition into the surrounding water. The treatment composition is described in more detail below.

The multicompartment water-soluble unit dose article comprises at least a first water-soluble film, a second water-soluble film, a third water-soluble film and a fourth water-soluble film. The first water-soluble film, the second water-soluble film, the third water-soluble film, the fourth water-soluble film, or a mixture thereof, comprises a water soluble polyvinyl alcohol polymer wherein the water soluble polyvinyl alcohol polymer is a polyvinyl alcohol homopolymer, and wherein the polyvinyl alcohol homopolymer comprises a vinyl alcohol monomer unit, and optionally but preferably a vinyl acetate monomer unit. Without wishing to be bound by theory, the water-soluble polyvinyl alcohol polymer should be understood to also encompass a mixture of polyvinyl alcohol homopolymers, wherein each polyvinyl alcohol homopolymer comprises a vinyl alcohol monomer unit, and optionally but preferably a vinyl acetate monomer unit.

The multicompartment water-soluble unit dose article comprises at least one seal region in which the at least first water-soluble film, the second water-soluble film, the third water-soluble film and the fourth water-soluble films are sealed together. The seal region should be understood to mean an area in which at least a first film and a second film are sealed together. The seal region comprises at least one area in which at least the first water-soluble film, the second water-soluble film, the third water-soluble film and the fourth water-soluble films are sealed together, in other words, all four films are sealed to one another. The seal region may comprise a flange region. The flange region is composed of excess sealed film material and is present on the outside of the unit dose article. Preferably, the seal region comprises a flange region wherein the first water-soluble film, the second water-soluble film, the third water-soluble film and the fourth water-soluble films are at least partially sealed together in the flange region. In other words, the flange region may comprise areas in which all 4 films are sealed together and areas wherein less than 4 films are sealed together. Alternatively, the whole of the flange region may comprise at least the first water-soluble film, the second water-soluble film, the third water-soluble film and the fourth water-soluble films sealed together.

Preferably, the water-soluble films are sealed together via solvent sealing, heat sealing or a mixture thereof. More preferably the water-soluble films are sealed together using solvent sealing, most preferably each water-soluble film is sealed to one or more of the other water-soluble films using solvent sealing. Preferably when solvent sealing, the solvent comprises water, more preferably the solvent consists of >99% by weight of the solvent of water.

The water-soluble films define at least two internal compartments wherein one internal compartment is positioned above the other internal compartment in a superposed orientation, in other words, one compartment positioned on top of another as opposed to side-by-side. In such an orientation, the two internal compartments are separated from one another by two water-soluble films. Alternatively, at least one internal compartment is formed between the first water-soluble film and the second water-soluble film, at least one internal compartment is formed between the third water-soluble film and the fourth water-soluble film, and at least one internal compartment is formed between the second water-soluble film and the third water-soluble film. This results in a 'dual layer' superposed water soluble unit dose article.

Preferably, the first water-soluble film and the second water-soluble film are configured to form at least one internal compartment and the third water-soluble film and fourth water-soluble film are configured to form at least one internal compartment. Preferably, the at least one internal compartment formed by the third water-soluble and fourth water-soluble film is superposed onto the at least one compartment formed by the first water-soluble film and the second water-soluble film such that the second water-soluble film and the third water-soluble film are in direct contact with one another. In other words, one internal compartment is positioned above another internal compartment and the two internal compartments are separated by two films. Therefore, the second and third water soluble films are contacted as such that a seal between the first, second, third and fourth water soluble film is created, most preferably within the flange region.

The water-soluble unit dose article may comprise at least three, preferably at least four internal compartments.

Preferably, the third water-soluble film and the fourth water-soluble film are configured to form at least two internal compartments arranged in a side-by-side configuration. More preferably, the third water-soluble film and the fourth water-soluble film are configured to form at least three internal compartments arranged in a side-by-side configuration.

The first water-soluble film and the second water-soluble film may be configured to form at least two internal compartments arranged in a side-by-side configuration.

Preferably, the third water-soluble film and the fourth water-soluble film are configured to form at least two internal compartments, or even at least three internal compartments arranged in a side-by-side configuration and the first water-soluble film and the second water-soluble film are configured to form one internal compartment, and the two, preferably three internal compartments formed by the third water-soluble film and the fourth water-soluble film are superposed onto the one internal compartment formed by the first water-soluble film and the second water-soluble film such that the second water-soluble film and the third water-soluble film are in direct contact with one another. The second and third water soluble films are contacted such that a seal area between the first, second, third and fourth water soluble films is created, most preferably within the flange region.

The water-soluble unit dose article may comprise a fifth water-soluble film and a sixth water-soluble film. The fifth water-soluble film and the sixth water-soluble film may be configured to form at least one internal compartment. Preferably the fourth water-soluble film and the fifth water-soluble films are at least partially sealed together creating a dual layered water soluble unit dose article. The fourth water-soluble film and fifth water-soluble film may be partially sealed in the flange area. The first water-soluble film, the second water-soluble film, the third water-soluble film, the fourth water-soluble film, the fifth water-soluble film and the sixth water-soluble film may all be sealed together in the seal region. The first water-soluble film, the second water-soluble film, the third water-soluble film, the fourth water-soluble film, the fifth water-soluble film and the sixth water-soluble film may all be sealed together in the flange region.

Alternatively, dual layered water-soluble unit dose articles may be configured with four water soluble films solely, i.e. solely having one separating film layer between each compartment layer, the four water soluble films again be sealed together in the seal region, preferably in the flange region. In other words, at least one internal compartment is formed between the first water-soluble film and the second water-soluble film, at least one internal compartment is formed between the third water-soluble film and the fourth water-soluble film, and at least one internal compartment is formed between the second water-soluble film and the third water-soluble film.

FIG. 1 discloses a water-soluble unit dose article (1) according to the present invention. The water-soluble unit dose article (1) comprises a fourth water-soluble film (2) and a first water-soluble film (3) which are sealed together at a seal region (4). Not shown here are the second water-soluble film and the third water-soluble. The treatment composition (5) is comprised within the water-soluble soluble unit dose article (1).

Figure 2:
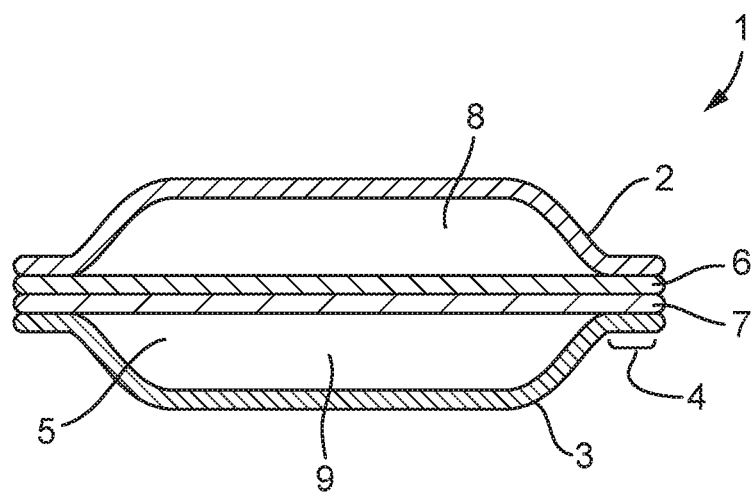
FIG. 2 is a cross-sectional view of a unit dose article according to the present disclosure.

FIG. 2 shows a cross-section of a water-soluble unit dose article (1) according to the present invention. The first water-soluble film (3) and second water-soluble film (7) define a first internal compartment (9). The third water-soluble film (6) and the fourth water-soluble film (2) define a second internal compartment (8). The second internal compartment (8) is superposed on the first internal compartment (9). The first water-soluble film (3), the second water-soluble film (7), the third water-soluble film (6) and the fourth water-soluble film (2) are all sealed together in the flange area (4).

Figure 3:
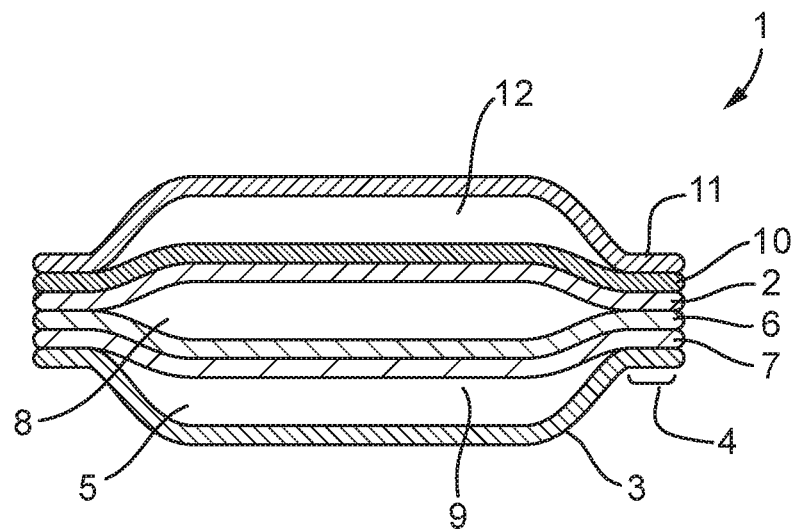
FIG. 3 is a cross-sectional view of an alternative water-soluble unit dose article according to the present disclosure.

FIG. 3 shows a cross-section of a water-soluble unit dose article (1) according to FIG. 2. However, the water-soluble unit dose article (1) comprises a fifth water-soluble film (10) and a sixth water-soluble film (11). The fifth water-soluble film (10) and the sixth water-soluble film (11) may be configured to form at least one internal compartment (12). The first water-soluble film (3), the second water-soluble film (7), the third water-soluble film (6), the fourth water-soluble film (2), the fifth water-soluble film (10) and the sixth water-soluble film (11) are all sealed together in the flange region (4).

Figure 4:
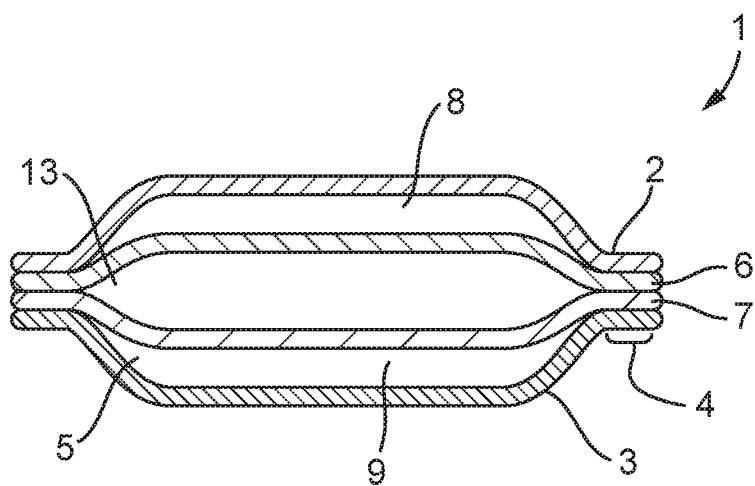
FIG. 4 is a cross-sectional view of yet a further alternative water-soluble unit dose article according to the present disclosure.

FIG. 4 shows a cross-section of a water-soluble unit dose article (1) according to FIG. 2. However, a further internal compartment (13) is positioned between the third water-soluble film (6) and second water-soluble film (7).

Water-Soluble Film

The water-soluble films of the present invention are soluble or dispersible in water. The water-soluble films preferably each independently have a thickness of 20 microns to 150 microns, preferably 35 microns to 125 microns, even more preferably 50 microns to 110 microns, most preferably about 76 microns.

Preferably, each water-soluble film has a water-solubility of at least 50%, preferably at least 75% or even at least 95%, as measured by the method set out here after using a glass-filter with a maximum pore size of 20 microns:

5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

Without wishing to be bound by theory, the term "homopolymer" generally includes polymers having a single type of monomeric repeating unit (e.g., a polymeric chain consisting of or consisting essentially of a single monomeric repeating unit). For the particular case of polyvinylalcohol, the term "homopolymer" further includes copolymers having a distribution of vinyl alcohol monomer units and optionally vinyl acetate monomer units, depending on the degree of hydrolysis (e.g., a polymeric chain consisting of or consisting essentially of vinyl alcohol and vinyl acetate monomer units). In the limiting case of 100% hydrolysis, a polyvinylalcohol homopolymer can include a true homopolymer having only vinyl alcohol units.

Without wishing to be bound by theory, the term "copolymer" generally includes polymers having two or more types of monomeric repeating units (e.g., a polymeric chain consisting of or consisting essentially of two or more different monomeric repeating units, whether as random copolymers, block copolymers, etc.). For the particular case of polyvinylalcohol, the term "copolymer" (or "polyvinylalcohol copolymer") further includes copolymers having a distribution of vinyl alcohol monomer units and vinyl acetate monomer units, depending on the degree of hydrolysis, as well as at least one other type of monomeric repeating unit (e.g., a ter-(or higher) polymeric chain consisting of or consisting essentially of vinyl alcohol monomer units, vinyl acetate monomer units, and one or more other monomer units, for example anionic, cationic or nonionic monomer units). In the limiting case of 100% hydrolysis, a polyvinylalcohol copolymer can include a copolymer having vinyl alcohol units and one or more other monomer units, but no vinyl acetate units. These polyvinyl alcohol copolymers are excluded from the invention.

The first water-soluble film, the second water-soluble film, the third water-soluble film, the fourth water-soluble film, or a mixture thereof, comprises a water soluble polyvinyl alcohol polymer wherein the water soluble polyvinyl alcohol polymer consists of a polyvinyl alcohol polymer is a polyvinyl alcohol homopolymer, and wherein the polyvinyl alcohol homopolymer comprises a vinyl alcohol monomer unit, and optionally but preferably a vinyl acetate monomer unit.

Preferably, the polyvinyl alcohol homopolymer has an average viscosity (gi) in a range of between 4 mPa·s and 30 mPa·s, preferably between 10 mPa·s and 25 mPa·s, measured as a 4% polyvinyl alcohol polymer solution in demineralized water at 20 degrees C. The viscosity of a polyvinyl alcohol polymer is determined by measuring a freshly made solution using a Brookfield LV type viscometer with UL adapter as described in British Standard EN ISO 15023-2: 2006 Annex E Brookfield Test method. It is international practice to state the viscosity of 4% aqueous polyvinyl alcohol solutions at 20° C.

It is well known in the art that the viscosity of an aqueous water-soluble polymer solution (polyvinylalcohol or otherwise) is correlated with the weight-average molecular weight of the same polymer, and often the viscosity is used as a proxy for weight-average molecular weight. Thus, the weight-average molecular weight of the first polyvinylalcohol polymer can be in a range of 30,000 to 175,000, or 30,000 to 100,000, or 55,000 to 80,000.

Preferably, the polyvinyl alcohol homopolymer, or mixture thereof, has an average degree of hydrolysis in a range of between 75% and 99%, preferably between 80% and 95%, most preferably between 85% and 95%.

Preferably, the total amount of any polyvinylalcohol homopolymer present in any individual film is between 30% and 95%, preferably between 40% and 80%, more preferably between 60% and 70% by weight of that individual film. Herein we mean the total amount of any polyvinylalcohol polymer present in the film including as a polyvinyl alcohol polymer blend. Preferably, any individual water-soluble film comprises a polyvinylalcohol polymer blend of two different polymers preferably in a weight ratio of from 90/10 to 10/90 preferably from 80/20 to 20/80, most preferably from 70/30 to 30/70 by weight of total polyvinyl alcohol polymer present in each individual film.

Suitable water soluble films comprising polyvinyl alcohol selected from polyvinyl alcohol homopolymers could be obtained, for example from the MonoSol, Nippon Gohsei or Aicello companies.

Preferably all water soluble films of the water-soluble unit dose article according to the invention each comprise polyvinyl alcohol homopolymers that are the same as one another. In other words, all at least four films may have the same polyvinyl alcohol polymer chemistry. The at least four films may differ slightly in total film composition due to migration of materials from the treatment composition into the film or from the film into the treatment composition or towards the surrounding atmosphere, however, the underlying polyvinyl alcohol polymer chemistry will remain the same. Most preferably all water soluble films each comprise a polyvinyl alcohol consisting of a polyvinyl alcohol homopolymer or mixture thereof, the polyvinyl alcohol polymer being the same across all films. The polyvinyl alcohol homopolymer comprises vinyl alcohol monomer units and optionally but preferably vinyl acetate monomer units.

The water-soluble film can contain auxiliary agents and processing agents, such as, but not limited to plasticizers, plasticizer compatibilizers, surfactants, lubricants, release agents, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes.

Preferably, the first water-soluble film, the second water-soluble film, the third water-soluble film, the fourth water-soluble film, or a mixture thereof, comprises one or more plasticizers in an amount in a range of between 5% and 50%, preferably between 10% and 40%, most preferably between 20% and 30% by weight of the individual film. Suitable plasticisers include those selected from polyols, sugar alcohols, or a mixture thereof. Suitable polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof. Suitable sugar alcohols include sugar alcohols selected from the group consisting of isomalt, maltitol, sorbitol, xylitol, erythritol, adonitol, dulcitol, pentaerythritol and mannitol, or a mixture thereof. A preferred plasticizer is glycerin, sorbitol, triethyleneglycol, 1,2-propylene glycol, dipropylene glycol, 2-methyl-1,3-propanediol, trimethylolpropane, or a combination thereof. One particularly suitable plasticizer system includes a blend of glycerol, sorbitol and trimethylol propane. Another particularly suitable plasticizer system includes a blend of glycerin, dipropylene glycol, and sorbitol.

Preferably, the first water-soluble film, the second water-soluble film, the third water-soluble film, the fourth water-soluble film or a mixture thereof comprises a surfactant. Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof. Preferably, the amount of surfactant in any individual water-soluble film is in a range of from 0.1% to 2.5%, preferably from 1% to 2% by weight of an individual water-soluble film.

Preferably, the first water-soluble film, the second water-soluble film, the third water-soluble film, the fourth water-soluble film or a mixture thereof comprise lubricants/release agents. Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. the amount of lubricant/release agent in each individual water-soluble film is in a range of from 0.02% to 1.5%, preferably from 0.1% to 1% by weight of an individual water-soluble film.

Preferably, the first water-soluble film, the second water-soluble film, the third water-soluble film, the fourth water-soluble film or a mixture thereof comprise fillers, extenders, antiblocking agents, detackifying agents or a mixture thereof. Suitable fillers, extenders, antiblocking agents, detackifying agents or a mixture thereof include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. Preferably, the amount of filler, extender, antiblocking agent, detackifying agent or mixture thereof in any individual water-soluble film is in a range of from 0.1% to 25%, preferably from 1% to 10%, more preferably from 2% to 8%, most preferably from 3% to 5% by weight of an individual water-soluble film. In the absence of starch, one preferred range for a suitable filler, extender, antiblocking agent, detackifying agent or mixture thereof is from 0.1% to 1%, preferably 4%, more preferably 6%, even more preferably from 1% to 4%, most preferably from 1% to 2.5%, by weight of an individual film.

Preferably, the first water-soluble film, the second water-soluble film, the third water-soluble film, the fourth water-soluble film or a mixture thereof have a residual moisture content of at least 4%, more preferably in a range of from 4% to 15%, even more preferably of from 5% to 10% by weight of the individual film, as measured by Karl Fischer titration.

Preferably, the first water-soluble film, the second water-soluble film, the third water-soluble film, the fourth water-soluble film or a mixture thereof comprises an aversive agent, preferably a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 ppm to 5000 ppm, or even 100 ppm to 2500 ppm, or even 250 ppm to 2000 rpm.

The first water-soluble film, the second water-soluble film, the third water-soluble film, the fourth water-soluble film or a mixture thereof may be opaque, transparent or translucent. The first water-soluble film, the second water-soluble film, the third water-soluble film, the fourth water-soluble film or a mixture thereof may comprise a printed area. The area of print may be achieved using standard techniques, such as flexographic printing or inkjet printing.

Method of Making Film

One contemplated class of embodiments is characterized by the water-soluble film being formed by, for example, admixing, co-casting, or welding the first polyvinyl alcohol polymer according to the types and amounts described herein, together with the preferred and optional secondary additives described herein. If the polymers are first admixed then the water-soluble film is preferably formed by casting the resulting admixture (e.g., along with other plasticizers and other additives) to form a film. If the polymers are welded, the water-soluble film can be formed by, for example, solvent or thermal welding. Another contemplated class of embodiments is characterized by the water-soluble film being formed by extrusion, for example, blown extrusion. Most preferably the water soluble films according to the invention are prepared by solvent casting.

Optionally, the water-soluble film can be a free-standing film consisting of one layer or a plurality of like layers.

Treatment Composition

The water-soluble unit dose article comprises a treatment composition. The treatment composition may be comprised within one or more than one internal compartment. Each internal compartment may comprise a treatment composition. The treatment composition in each compartment may be the same or different to another internal compartment.

The treatment composition may be selected from laundry treatment composition, dishwashing composition, hard surface treatment composition or a mixture thereof, preferably a laundry treatment composition, more preferably a laundry treatment composition selected from laundry detergent composition, laundry softening composition, laundry freshness composition or a mixture thereof, preferably a laundry detergent composition. Preferred laundry and automatic dishwashing detergent compositions are described in more detail below.

Automatic Dishwashing Detergent Composition

The treatment composition may be an automatic dish washing composition comprising an ingredient selected from surfactant, builder, sulfonated/carboxylated polymer, silicone suds suppressor, silicate, metal and/or glass care agent, enzyme, bleach, bleach activator, bleach catalyst, source of alkalinity, perfume, dye, solvent, filler and mixtures thereof.

A preferred surfactant for use in automatic dishwashing detergents is low foaming by itself or in combination with other components (e.g. suds suppressers). Preferred for use herein are low and high cloud point nonionic surfactants and mixtures thereof including nonionic alkoxylated surfactants (especially ethoxylates derived from C6-C18 primary alcohols), ethoxylated-propoxylated alcohols (e.g., Olin Corporation's POLY-TERGENT® SLF18), epoxy-capped poly (oxyalkylated) alcohols (e.g., Olin Corporation's POLY-TERGENT® SLF18B, ether-capped poly(oxyalkylated) alcohol surfactants, and block polyoxyethylene-polyoxypropylene polymeric compounds such as PLURONIC®, REVERSED PLURONIC®, and TETRONIC® series by the BASF-Wyandotte Corp., Wyandotte, Mich.; amphoteric surfactants such as the C12-C20 alkyl amine oxides (preferred amine oxides for use herein include lauryldimethyl amine oxide and hexadecyl dimethyl amine oxide), and alkyl amphocarboxylic surfactants such as MIRANOL™ C2M; and zwitterionic surfactants such as the betaines and sultaines; and mixtures thereof. Surfactants can be present at a level of from 0.2% to 30% by weight, more preferably from 0.5% to 10% by weight, most preferably from 1% to 5% by weight of a detergent composition.

Builders suitable for use in the detergent composition described herein include water-soluble builders, including citrates, carbonates, silicate and polyphosphates, e.g. sodium tripolyphosphate and sodium tripolyphosphate hexahydrate, potassium tripolyphosphate and mixed sodium and potassium tripolyphosphate salts.

Enzymes suitable for use in the detergent composition described herein include bacterial and fungal cellulases including CAREZYME® and CELLUZYME® (Novo Nordisk A/S); peroxidases; lipases including AMANO-P® (Amano Pharmaceutical Co.), M1 LIPASE® and LIPOMAX® (Gist-Brocades) and LIPOLASE® and LIPOLASE ULTRA® (Novo); cutinases; proteases including ESPERASE®, ALCALASE®, DURAZYM® and SAVINASE® (Novo) and MAXATASE®, MAXACAL®, PROPERASE® and MAXAPEM® (Gist-Brocades); α and β amylases including PURAFECT® OX AM (Genencor) and TERMAMYL®, BAN®, FUNGAMYL®, DURAMYL®, and NATALASE® (Novo); pectinases; and mixtures thereof. Enzymes can be added herein as prills, granulates, or cogranulates at levels typically in the range from 0.0001% to 2% pure enzyme by weight of the cleaning composition.

Suds suppressers suitable for use in the detergent composition described herein include nonionic surfactants having a low cloud point. "Cloud point" as used herein, is a well known property of nonionic surfactants which is the result of the surfactant becoming less soluble with increasing temperature, the temperature at which the appearance of a second phase is observable is referred to as the "cloud point." As used herein, a "low cloud point" nonionic surfactant is defined as a nonionic surfactant system ingredient having a cloud point of less than 30° C., preferably less than about 20° C., and even more preferably less than about 10° C., and most preferably less than about 7.5° C. Low cloud point nonionic surfactants can include nonionic alkoxylated surfactants, especially ethoxylates derived from primary alcohol, and polyoxypropylene/polyoxyethylene/polyoxypropylene (PO/EO/PO) reverse block polymers. Also, such low cloud point nonionic surfactants can include, for example, ethoxylated-propoxylated alcohol (e.g., BASF POLY-TERGENT® SLF18) and epoxy-capped poly(oxyalkylated) alcohols (e.g., BASF POLY-TERGENT® SLF18B series of nonionics.

Other suitable components for use in the detergent composition described herein include cleaning polymers having anti-redeposition, soil release or other detergency properties. Anti-redeposition polymers for use herein include acrylic acid containing polymers such as SOKALAN® PA30, PA20, PA15, PA10 and SOKALAN® CP10 (BASF GmbH), ACUSOL® 45N, 480N, 460N (Rohm and Haas), acrylic acid/maleic acid copolymers such as SOKALAN® CP5, and acrylic/methacrylic copolymers. Other suitable polymers include amine-based polymers such as alkoxylated polyalkyleneimines (e.g., PEI600 EO2O and/or ethoxysulfated hexamethylene diamine dimethyl quats), which, optionally, may be quaternized. Soil release polymers for use herein include alkyl and hydroxyalkyl celluloses, polyoxyethylenes, polyoxypropylenes and copolymers thereof, and non-ionic and anionic polymers based on terephthalate esters of ethylene glycol, propylene glycol and mixtures thereof.

Heavy metal sequestrants and crystal growth inhibitors are also suitable for use in the detergent, for example diethylenetriamine penta(methylene phosphonate), ethylenediamine tetra(methylene phosphonate) hexamethylenediamine tetra(methylene phosphonate), ethylene diphosphonate, hydroxy-ethylene-1,1-diphosphonate, nitrilotriacetate, ethylenediaminotetracetate, ethylenediamine-N,N'-disuccinate in their salt and free acid forms.

Suitable for use in the detergent composition described herein is also a corrosion inhibitor, for example organic silver coating agents (especially paraffins such as WINOG® 70 sold by Wintershall, Salzbergen, Germany), nitrogen-containing corrosion inhibitor compounds (for example benzotriazole and benzimadazole and Mn(II) compounds, particularly Mn(II) salts of organic ligands.

Other suitable components for use in the detergent composition herein include enzyme stabilizers, for example calcium ion, boric acid and propylene glycol.

Suitable rinse additives are known in the art. Commercial rinse aids for dishwashing typically are mixtures of low-foaming fatty alcohol polyethylene/polypropylene glycol ethers, solubilizers (for example cumene sulfonate), organic acids (for example citric acid) and solvents (for example ethanol). The function of such rinse aids is to influence the interfacial tension of the water in such a way that it is able to drain from the rinsed surfaces in the form of a thin coherent film, so that no water droplets, streaks, or films are left after the subsequent drying process.

Laundry Detergent Composition

The laundry detergent composition may be a powder, a liquid or a mixture thereof, preferably a liquid.

The term 'liquid laundry detergent composition' refers to any laundry detergent composition comprising a liquid capable of wetting and treating a fabric, and includes, but is not limited to, liquids, gels, pastes, dispersions and the like. The liquid composition can include solids or gases in suitably subdivided form, but the liquid composition excludes forms which are non-fluid overall, such as tablets or granules.

By powder we herein mean the laundry detergent composition may comprise solid particulates or may be a single homogenous solid. Preferably, the powder laundry detergent composition comprises particles. This means the powder laundry detergent composition comprises individual solid particles as opposed to the solid being a single homogenous solid. The particles may be free-flowing or may be compacted, preferably free-flowing.

The laundry detergent composition can be used in a fabric hand wash operation or may be used in an automatic machine fabric wash operation.

Preferably, the laundry detergent composition comprises a non-soap surfactant. The non-soap surfactant is preferably selected from non-soap anionic surfactant, non-ionic surfactant or a mixture thereof. Preferably, the laundry detergent composition comprises between 10% and 60%, more preferably between 20% and 55% by weight of the laundry detergent composition of the non-soap surfactant.

Preferably, the anionic non-soap surfactant comprises linear alkylbenzene sulphonate, alkyl sulphate, alkoxylated alkyl sulphate or a mixture thereof. Preferably, the alkoxylated alkyl sulphate is an ethoxylated alkyl sulphate.

Preferably, the laundry detergent composition comprises between 5% and 60%, preferably between 15% and 55%, more preferably between 25% and 50%, most preferably between 30% and 45% by weight of the detergent composition of the non-soap anionic surfactant.

Preferably, the non-soap anionic surfactant comprises linear alkylbenzene sulphonate and alkoxylated alkyl sulphate, wherein the ratio of linear alkylbenzene sulphonate to alkoxylated alkyl sulphate preferably the weight ratio of linear alkylbenzene sulphonate to ethoxylated alkyl sulphate is from 1:10 to 10:1, preferably from 6:1 to 1:6, more preferably from 4:1 to 1:4, even more preferably from 3:1 to 1:1. Alternatively the weight ratio of linear alkylbenzene sulphonate to ethoxylated alkyl sulphate is from 1:2 to 1:4. The alkoxylated alkyl sulphate can be derived from a synthetic alcohol or a natural alcohol, or from a blend thereof, pending the desired average alkyl carbon chain length and average degree of branching. Preferably, the synthetic alcohol is made following the Ziegler process, OXO-process, modified OXO-process, the Fischer Tropsch process, Guerbet process or a mixture thereof. Preferably, the naturally derived alcohol is derived from natural oils, preferably coconut oil, palm kernel oil or a mixture thereof.

Preferably, the laundry detergent composition comprises between 0% and 15%, preferably between 0.01% and 12%, more preferably between 0.1% and 10%, most preferably between 0.15% and 7% by weight of the laundry detergent composition of a non-ionic surfactant. The non-ionic surfactant is preferably selected from alcohol alkoxylate, Ziegler-synthesized alcohol alkoxylate, an oxo-synthesized alcohol alkoxylate, Guerbet alcohol alkoxylates, alkyl phenol alcohol alkoxylates or a mixture thereof.

Preferably, the laundry preferably liquid laundry detergent composition comprises between 1.5% and 20%, more preferably between 2% and 15%, even more preferably between 3% and 10%, most preferably between 4% and 8% by weight of the laundry detergent composition of soap, preferably a fatty acid salt, more preferably an amine neutralized fatty acid salt, wherein preferably the amine is an alkanolamine more preferably selected from monoethanolamine, diethanolamine, triethanolamine or a mixture thereof, more preferably monoethanolamine.

Preferably, the laundry detergent composition comprises a non-aqueous solvent, preferably wherein the non-aqueous solvent is selected from 1,2-propanediol, dipropylene glycol, tripropyleneglycol, glycerol, sorbitol, polypropylene glycol or a mixture thereof, preferably wherein the polypropyleneglycol has a molecular weight of 400. Preferably the liquid laundry detergent composition comprises between 10% and 40%, preferably between 15% and 30% by weight of the liquid laundry detergent composition of the non-aqueous solvent. Without wishing to be bound by theory the non-aqueous solvents ensure appropriate levels of film plasticization so the film is not too brittle and not too 'floppy'. Without wishing to be bound by theory, having the correct degree of plasticization will also facilitate film dissolution when exposed to water during the wash process.

Preferably, the liquid laundry detergent composition comprises between 0.5% and 15%, preferably between 5% and 13% by weight of the liquid laundry detergent composition of water. Preferably, the laundry detergent composition comprises an ingredient selected from the list comprising cationic polymers, polyester terephthalates, amphiphilic graft co-polymers, carboxymethylcellulose, enzymes, perfumes, encapsulated perfumes, bleach or a mixture thereof.

The laundry detergent composition may comprise an adjunct ingredient, wherein the adjunct ingredient is selected from ethanol, ethyleneglycol, polyethyleneglycol, hueing dyes, aesthetic dyes, enzymes, builders preferably citric acid, chelants, cleaning polymers, dispersants, dye transfer inhibitor polymers, fluorescent whitening agent, opacifier, antifoam, preservatives, anti-oxidants, or a mixture thereof. Preferably the chelant is selected from aminocarboxylate chelants, aminophosphonate chelants, or a mixture thereof.

Preferably, the laundry detergent composition has a pH between 6 and 10, more preferably between 6.5 and 8.9, most preferably between 7 and 8, wherein the pH of the laundry detergent composition is measured as a 10% dilution in demineralized water at 20° C.

The liquid laundry detergent composition may be Newtonian or non-Newtonian. Preferably, the liquid laundry detergent composition is non-Newtonian. Without wishing to be bound by theory, a non-Newtonian liquid has properties that differ from those of a Newtonian liquid, more specifically, the viscosity of non-Newtonian liquids is dependent on shear rate, while a Newtonian liquid has a constant viscosity independent of the applied shear rate. The decreased viscosity upon shear application for non-Newtonian liquids is thought to further facilitate liquid detergent dissolution. The liquid laundry detergent composition described herein can have any suitable viscosity depending on factors such as formulated ingredients and purpose of the composition. When Newtonian the composition may have a viscosity value, at a shear rate of 20 s−1 and a temperature of 20° C., of 100 to 3,000 cP, alternatively 200 to 2,000 cP, alternatively 300 to 1,000 cP, following the method described herein. When non-Newtonian, the composition may have a high shear viscosity value, at a shear rate of 20 s−1 and a temperature of 20° C., of 100 to 3,000 cP, alternatively 300 to 2,000 cP, alternatively 500 to 1,000 cP, and a low shear viscosity value, at a shear rate of 1 s−1 and a temperature of 20° C., of 500 to 100,000 cP, alternatively 1000 to 10,000 cP, alternatively 1,300 to 5,000 cP, following the method described herein. Methods to measure viscosity are known in the art. According to the present disclosure, viscosity measurements are carried out using a rotational rheometer e.g. TA instruments AR550. The instrument includes a 40 mm 2° or 1° cone fixture with a gap of around 50-60 μm for isotropic liquids, or a 40 mm flat steel plate with a gap of 1000 μm for particles containing liquids. The measurement is carried out using a flow procedure that contains a conditioning step, a peak hold and a continuous ramp step. The conditioning step involves the setting of the measurement temperature at 20° C., a pre-shear of 10 seconds at a shear rate of 10 s1, and an equilibration of 60 seconds at the selected temperature. The peak hold involves applying a shear rate of 0.05 s1 at 20° C. for 3 min with sampling every 10 s. The continuous ramp step is performed at a shear rate from 0.1 to 1200 s1 for 3 min at 20° C. to obtain the full flow profile.

Process of Making

A further aspect of the present invention is a process for making a water-soluble unit dose article according to the present invention comprising the steps of;

a. deforming the first water-soluble film into a cavity to make at least one open compartment;
b. Filling the at least one open compartment from step a with a treatment composition;
c. Closing the at least one open compartment from step b with the second water-soluble film;
d. Sealing the first water-soluble film and the second water-soluble film together to make an at least first closed intermediate article;
e. Deforming the fourth water-soluble film into a cavity to create at least one open compartment;
f. Filling the at least one open compartment from step e with a treatment composition;
g. Closing the at least one open compartment from step f with the third water-soluble film;
h. Sealing the third water-soluble film and the fourth water-soluble film together to form at least a second closed intermediate article;
i. Bringing the first closed intermediate article and the second closed intermediate article into contact with one another such that the second water-soluble film and the third water-soluble film are brought into contact with one another;
j. Creating at least a partial seal between the second water-soluble film and third water-soluble film to create the water-soluble unit dose article.

Preferably, in step j, at least the first water-soluble film, the second water-soluble film, the third water-soluble film and the fourth water-soluble films are sealed together, in other words, all four films are sealed to one another.

Preferably, the process involves making a water-soluble unit dose article with a flange region wherein the first water-soluble film, the second water-soluble film, the third water-soluble film and the fourth water-soluble films are at least partially sealed together in the flange region. The flange region may be comprised entirely of the first water-soluble film, the second water-soluble film, the third water-soluble film and the fourth water-soluble films all sealed together.

Steps a-d may be conducted on a belt or a rotary drum. Steps e-h may be conducted on a belt or a rotary drum. Suitable apparatus may include apparatus having a horizontal belt with a rotary drum positioned above or aside, preferably above said belt. Alternatively, suitable apparatus may include apparatus having a rotary drum positioned above or aside, preferably above a second rotary drum. Alternatively, suitable apparatus may include apparatus having a belt positioned above or aside, preferably above another belt.

The above process may comprise the further steps of deforming a fifth water-soluble film to create an open compartment, filling said open compartment with a treatment composition, closing said open compartment with a sixth water-soluble film, sealing said fifth and sixth water-soluble films to create an intermediate closed article sealing the fifth and fourth water-soluble films together.

An alternative process may include the steps of;
a. deforming the third water-soluble film into a cavity to make a first open compartment;
b. Filling the first open compartment from step a with a treatment composition;
c. Closing the first open compartment from step b with the fourth water-soluble film; d. Sealing the third water-soluble film and the fourth water-soluble film together to make an at least first closed intermediate article;
e. Deforming the first water-soluble film into a cavity to create a second open compartment;
f. Filling the second open compartment from step e with a treatment composition;
g. Deforming the second water-soluble film into a cavity to create a third open compartment;
h. Filling the third open compartment from step g with a treatment composition;
i. Closing the third open compartment from step h with the first closed intermediate article from step d by sealing the second and fourth water-soluble films together to create an intermediate superposed article;
j. Closing the second open compartment from step f with the intermediate superposed article from step i by sealing the first and third water-soluble films together to create the final superposed 4 film water-soluble unit dose article.

Suitable apparatus may include apparatus having a horizontal belt with two rotary drums positioned above or aside, preferably above said belt. Alternatively, suitable apparatus may include apparatus having two rotary drums positioned above or aside, preferably above a third rotary drum. Alternatively, suitable apparatus may include apparatus having two belts positioned above or aside preferably above another belt.

Process of Using

A further aspect of the present invention is a method of washing comprising the steps of adding the water-soluble unit dose article according to the present invention to sufficient water to dilute the laundry detergent composition by a factor of at least 200 fold, preferably between 250 and 3000 fold, more preferably between 250 and 1500 fold, most preferably between 500 and 1500 fold to create a wash liquor and contacting articles to be washed with said wash liquor.

Without wishing to be bound by theory, when the water-soluble unit dose article is added to water, the water-soluble film dissolves releasing the internal treatment composition into the water. The treatment composition disperses in the water to create the wash liquor.

Preferably the wash liquor may comprise between 10 L and 75 L, preferably between 20 L and 70 L, more preferably between 30 L and 65 L of water.

Preferably, the wash liquor is at a temperature of between 5° C. and 90° C., preferably between 10° C. and 60° C., more preferably between 12° C. and 45° C., most preferably between 15° C. and 40° C.

Preferably, washing the fabrics in the wash liquor takes between 5 minutes and 50 minutes, preferably between 5 minutes and 40 minutes, more preferably between 5 minutes and 30 minutes, even more preferably between 5 minutes and 20 minutes, most preferably between 6 minutes and 18 minutes to complete.

When using as a laundry detergent, preferably, the wash liquor comprises between 1 kg and 20 kg, preferably between 5 kg and 20 kg, most preferably between 10 and 20 kg of fabrics.

The wash liquor may comprise water of any hardness preferably varying between 0 gpg to 40 gpg.

Examples

The sensitivity profile of 3 different polyvinyl alcohol based water soluble films to humidity variations has been determined following the Dynamic Vapour Sorption (DVS) test method described herein.

Film Materials:

3 different film samples (76 micron thickness each) were obtained from the Monosol company:
Film A: M8630—film comprising polyvinyl alcohol/monocarboxylate copolymer resin (outside of scope of present invention)
Film B: film comprising 60/40-70/30 blend of a polyvinyl alcohol homopolymer (13-23 cps, dH: 85-87%)/polyvinyl alcohol–maleate copolymer (15-20 cps, dH: 89-91%, 4% maleate by weight of copolymer)–total resin presence: 64-66% by weight of water soluble film (outside of scope of present invention).
Film 1: film comprising 50/50 blend of two polyvinyl alcohol homopolymers (13 cps & 23 cps respectively, dH: 85-88%, total resin presence: 66% by weight of water soluble film) (within scope of present invention)

All films comprised about 22-24% of a plasticizer system and about 6-7% of water, balancing the remainder to 100% with commonly used water soluble film additives. 4 film samples of each test film were respectively sealed together through solvent sealing; demineralized water at room temperature as sealing solvent, using an anilox roller, to generate a 4 layer thick film mimicking a 4 film seal area of a water soluble unit dose article.

Test Method: Dynamic Vapour Sorption

Film robustness against humidity variations was measured with a DVS (Dynamic Vapor Sorption) Instrument. The instrument used was an SPS-DVS (model SPSx-1µ-High load with permeability kit) from ProUmid. The DVS uses gravimetry for determination of moisture sorption/desorption and is fully automated. The accuracy of the system is ±0.6% for the RH (relative humidity) over a range of 0-98% and ±0.3° C. at a temperature of 25° C. The temperature can range from +5 to +60° C. The microbalance in the instrument is capable of resolving 0.1 g in mass change. For the specific conditions of the test, a 24 pan carousel which allows to test 23 films simultaneously (1 pan is used as a reference for the microbalance and needs to remain empty) was used. The temperature was fixed at 20° C. throughout the experiment. Relative humidity (RH) was set at 20% for 1 hour, and then gradually raised onto 50% in 5 min. The RH remained at 50% for 24 hours, and then gradually raised onto 80% in 5 minutes after which it was remained at 80% for 48 hours. The total duration of the measurement hence was about 73 hours. The cycle time (=time between measuring each pan) was set to 10 min and the DVS records each weight result vs. time and calculates automatically the % Dm (relative mass variation versus starting weight of the film, i.e. 10% reflects a 10% film weight increase versus starting film weight). Delta % Dm gained over 50% RH/80% RH respectively versus 20% RH were calculated by difference of the value % Dm at 50% RH/80% RH (last value measured at 50%/80% RH condition) minus % Dm at 20% RH (last value measured at 20% RH before going up to 50% RH). 3 replicates of each film are measured and the average relative mass variation (% Dm) value is reported.

Test Results:

The table below summarizes the relative film sample weight increase upon relative humidity increase from 20% to 50% to 80% for the different test films. From the data it can clearly be seen that the water soluble film according to the invention, wherein the polyvinyl alcohol polymer solely comprises polyvinyl alcohol homopolymer, hence lacking a polyvinyl alcohol copolymer comprising an anionic monomer unit (Film 1), is superior in view of robustness towards humidity variations, e.g. less water absorption upon humidity increases, compared to water soluble films outside the scope of the invention comprising a polyvinyl alcohol copolymer comprising an anionic monomer unit (Films A and B).

| Test condition (Delta % film weight increase) | 20% rH | 50% rH Delta [% Dm (50% RH)-% Dm (20% RH)] | 80% rH Delta [% Dm (80% RH)-% Dm (20% RH)] |
|---|---|---|---|
| Comparative film 1 (4 films) | Reference | 3.8 | 34.3 |
| Comparative film 2 (4 films) | Reference | 3.6 | 29.6 |
| Inventive film 1 (4 films) | Reference | 0.7 | 22.2 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multicompartment water-soluble unit dose article comprising at least a first water-soluble film, a second water-soluble film, a third water-soluble film, and a fourth water-soluble film,
    wherein the first water-soluble film, the second water-soluble film, the third water-soluble film, the fourth water-soluble film, or a mixture thereof, comprises a water-soluble polyvinyl alcohol polymer,
    wherein the water-soluble polyvinyl alcohol polymer is a polyvinyl alcohol homopolymer, and wherein the polyvinyl alcohol homopolymer comprises a vinyl alcohol monomer unit and a vinyl acetate monomer unit,
    wherein the water-soluble polyvinyl alcohol polymer does not comprise a polyvinyl alcohol copolymer,
    wherein the polyvinyl alcohol copolymer is defined as having a distribution of vinyl alcohol monomer units, optional vinyl acetate monomer units depending on the degree of hydrolysis, and at least one other type of monomeric repeating unit,
    wherein the at least one other type of monomeric repeating unit of the polyvinyl alcohol copolymer is an anionic, cationic, or nonionic monomer unit, and
    wherein the multicompartment water-soluble unit dose article comprises at least one seal region in which the first water-soluble film, the second water-soluble film, the third water-soluble film and the fourth water-soluble films are sealed together, and
    wherein the water-soluble films define at least two internal compartments in superposed position and the two internal compartments are separated from one another by at least two water-soluble films.

2. The water-soluble unit dose article according to claim 1, wherein the polyvinyl alcohol polymer has an average viscosity ($\mu_1$) in a range of between about 4 mPa·s and about 30 mPa·s, measured as an about 4% polyvinyl alcohol polymer solution in demineralized water at about 20° C.

3. The water-soluble unit dose article according to claim 1, wherein the polyvinyl alcohol polymer has an average degree of hydrolysis in a range of between about 75% and about 99%.

4. The water-soluble unit dose article according to claim 1, wherein the total amount of any polyvinyl alcohol polymer present in any individual film is between about 30% and about 95% by weight of that individual film.

5. The water-soluble unit dose article according to claim 1, wherein the first water-soluble film, the second water-soluble film, the third water-soluble film, and the fourth water-soluble film each comprise polyvinyl alcohol polymers that are the same as one another.

6. The water-soluble unit dose article according to claim 1, wherein the first water-soluble film and the second water-soluble film are configured to form at least one internal compartment, and wherein the third water-soluble film and fourth water-soluble film are configured to form at least one internal compartment, and wherein the at least one internal compartment formed by the third water-soluble and fourth water-soluble film is superposed onto the at least one compartment formed by the first water-soluble film and the second water-soluble film, and wherein the second water-soluble film and the third water-soluble film are in direct contact with one another.

7. The water-soluble unit dose article according to claim 1, wherein the water-soluble unit dose article comprises at least three internal compartments.

8. The water-soluble unit dose article according to claim 1, wherein the third water-soluble film and the fourth water-soluble film are configured to form at least two internal compartments arranged in a side-by-side configuration.

9. The water-soluble unit dose article according to claim 1, wherein the first water-soluble film and the second water-soluble film are configured to form at least two internal compartments arranged in a side-by-side configuration.

10. The water-soluble unit dose article according to claim 1, wherein the films are sealed together via solvent sealing, heat sealing, or a mixture thereof.

11. The water-soluble unit dose article according to claim 10, wherein the films are sealed together via solvent sealing, wherein the solvent sealing comprises a solvent, wherein the solvent comprises water.

12. The water-soluble unit dose article according to claim 1, wherein the seal region comprises a flange region, and wherein the first water-soluble film, the second water-soluble film, the third water-soluble film, and the fourth water-soluble films are at least partially sealed together in the flange region.

13. The water-soluble unit dose article according to claim 1, wherein the first water-soluble film, the second water-soluble film, the third water-soluble film, the fourth water-soluble film, or a mixture thereof comprises an aversive agent.

14. The water-soluble unit dose article according to claim 1, wherein at least one internal compartment comprises a treatment composition selected from a laundry treatment composition, dishwashing composition, hard surface treatment composition, or a mixture thereof.

15. A process for making a water-soluble unit dose article according to claim 1 comprising the steps of:
 a. deforming the first water-soluble film into a cavity to make at least one open compartment;
 b. filling the at least one open compartment from step a with a treatment composition;
 c. closing the at least one open compartment from step b with the second water-soluble film;
 d. sealing the first water-soluble film and the second water-soluble film together to make an at least first closed intermediate article;
 e. deforming the fourth water-soluble film into a cavity to create at least one open compartment;
 f. filling the at least one open compartment from step e with a treatment composition;
 g. closing the at least one open compartment from step f with the third water-soluble film;
 h. sealing the third water-soluble film and the fourth water-soluble film together to form at least a second closed intermediate article;
 i. bringing the first closed intermediate article and the second closed intermediate article into contact with one another such that the second water-soluble film and the third water-soluble film are brought into contact with one another;
 j. creating at least a partial seal between the second water-soluble film and third water-soluble film to create the water-soluble unit dose article.

* * * * *